United States Patent Office 2,770,632
Patented Nov. 13, 1956

2,770,632

CARBOXYESTER SUBSTITUTED SILOXANES

Robert L. Merker, Pittsburgh, Pa., assignor to Dow Corning Corporation, Midland, Mich., a corporation of Michigan No Drawing. Application May 20, 1954,
Serial No. 431,296

12 Claims. (Cl. 260—448.2)

This invention relates to siloxanes having carboxy functional groups attached to the silicon.

It is the object of this invention to prepare novel organosiloxanes which are useful as lubricants, rust inhibitors and emulsifiers. The compositions are particularly useful for emulsifying siloxane fluids. Another object of this invention is to prepare polyfunctional siloxanes which can react with polyhydric alcohols to form resins and which can be employed as additives for hydrocarbon substituted silicone fluids.

This invention relates to siloxanes of the formula $$(HOOCRCOOCH_2)R'_nSiO_{\frac{3-n}{2}}$$

where R is a divalent hydrocarbon radical or a hydroxylated divalent hydrocarbon radical, R' is a monovalent hydrocarbon radical and $n$ has a value from 1 to 2 inclusive.

The above siloxanes are best prepared by reacting a metallic salt (preferably an alkali metal salt) of the formula MOOCRCOOH (i. e. the acid salt or mono salt of a dicarboxylic acid) with a halomethylsiloxane of the formula $$XCH_2R'_nSiO_{\frac{3-n}{2}}$$

in which compounds R, R' and $n$ are as above defined. The reaction may be carried out at any desired temperature and preferably in the presence of a mutual solvent such as dimethylformamide. During the reaction it is preferred that the reaction mixture be acidic in order to prevent cleavage of the halomethyl groups of the siloxane. In general the reaction proceeds best at temperatures ranging from 80° C. up. After the reaction has been completed the metal chloride is removed by filtration or other means and the solvent is then removed to give the products of this invention.

Instead of employing the monosalt of the corresponding acid, one may employ mixtures of the disalt of the acid and the acid itself. In this case there should be at least one mol of the acid per mol of the disalt. During the reaction there will be some polymeric material formed which results from the reaction of the disalt with two halomethylsiloxane molecules.

The primary reaction of this invention may be represented by the following equation:

$$HOOCRCOOM + (XCH_2)R'_nSiO_{\frac{3-n}{2}} \longrightarrow$$

$$(HOOCRCOOCH_2)R'_nSiO_{\frac{3-n}{2}} + MX$$

For the purpose of this invention any dibasic carboxylic acid in which R is any divalent hydrocarbon radical or any hydroxylated divalent hydrocarbon radical can be employed to make the compositions of this invention. Specific examples of acids which are operative herein are aliphatic and cycloaliphatic acids such as malonic, malic, tartaric, pimelic, azelaic, tetraphenylsuccinic, cyclohexyldicarboxylic, maleic and dimethylfumaric and aromatic dicarboxylic acids such as phthalic, naphthalic, diphenic, stilbene dicarboxylic, tolane dicarboxylic, dibenzyldicarboxylic and hydroxylated aromatic dicarboxylic acids such as hydroxyterephthalic.

The siloxanes which are employed in the method of this invention are halomethylsiloxanes which contain at least 1 monovalent hydrocarbon radical attached to the silicon. For the purpose of this invention R' can be any monovalent hydrocarbon radical such as for example methyl, ethyl, octadecyl, cyclohexyl, vinyl, allyl, cyclohexenyl, phenyl, tolyl, benzyl, and xenyl. The siloxanes may contain either one or two monovalent hydrocarbon radicals attached to the silicon and these hydrocarbon radicals may be the same or different.

These halomethylsiloxanes may be prepared by halogenating the corresponding methylsiloxanes or they may be prepared by halogenating the corresponding methylhalosilanes and thereafter hydrolyzing the products. An alternative method is that of halogenating monomethyltrihalosilanes and thereafter reacting the halogenated material with a Grignard reagent carrying the monovalent hydrocarbon radical. Under these conditions preferential reaction will take place with a silicon bonded halogen rather than the halogen attached to the methyl radical.

The siloxanes of this invention may be copolymerized with hydrocarbon substituted siloxanes or with halogenated hydrocarbon substituted siloxanes of the formula $$R''_mSiO_{\frac{4-m}{2}}$$

in which R'' is any monovalent hydrocarbon radical or any halogenated monovalent hydrocarbon radical and $m$ has a value from 1 to 3 inclusive. The copolymerization may be carried out employing an acid catalyst in the conventional manner shown in the art. Such copolymers may contain from .01 to 99.99 mol percent of the siloxanes of this invention, the remainder being the aforesaid hydrocarbon and halogenated hydrocarbon substituted siloxanes. These copolymers are useful as lubricants, rust inhibitors and emulsifiers.

The following examples are illustrative only and should not be construed as limiting the invention which is properly set forth in the appended claims.

*Example 1*

82.3 g. of the disodium salt of adipic acid, 126.4 g. of adipic acid, 100 g. of bis-chloromethyltetramethyldisiloxane were mixed and heated at 200–220° C. for 2 hours. The product was extracted with benzene and after removal of the solvent the siloxane having the formula $$[HOOC(CH_2)_4COOCH_2Si]_2O \overset{Me_2}{}$$

was obtained. There was also obtained a complex polymeric material having the formula:

$$HOOC(CH_2)_4COOCH_2Si[OSiCH_2OOC(CH_2)_4COOCH_2Si]_xOSiCH_2OOC(CH_2)_4COOH \overset{Me_2\ Me_2\ \ \ \ \ \ Me_2\ Me_2}{}$$

The disodium salt of the siloxane acid $$[HOOC(CH_2)_4COOCH_2Si]_2O \overset{Me_2}{}$$

was made by reacting the product with NaOH. A 0.2 percent by weight aqueous solution of this salt was placed on a sheet of cold rolled steel. There was no rusting after 8 hours at room temperature. By contrast the same steel having a drop of water thereon rusted in ½ hour.

Calcium chloride was added to a solution of the salt $$[NaOOC(CH_2)_4COOCH_2Si]_2O \overset{Me_2}{}$$

whereupon the calcium salt of the disiloxane acid precipitated. This calcium salt was completely soluble in benzene and in phenylmethylpolysiloxane fluids. It was partially soluble in dimethylpolysiloxane fluids. A film of phenylmethylpolysiloxane fluid and dimethylpolysiloxane fluid each of which contained a small amount of the calcium salt were placed on sheets of cold rolled steel. Drops of water were placed on each coated sheet and no rusting was observed after 8 hours. By contrast when water was placed on the same steel coated with the siloxane fluids containing none of the salt, rusting occurred in 15 minutes.

Example 2

20 g. of

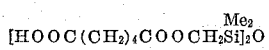

were mixed with octamethylcyclotetrasiloxane and with 1.5 g. of trifluoroacetic acid. The mixture was refluxed with stirring for 2 hours. The resulting product was a copolymer having the formula

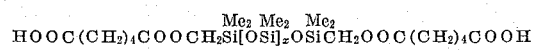

in which $x$ has a value of at least one.

Enough aqueous KOH was added to convert the acid ended siloxane to the potassium salt. Water was then removed at 100° C. under reduced pressure. The resulting salt was water soluble but gave a clouded solution similar to that of soap. This material was suitable as an emulsifying agent.

Example 3

20 g. of bis-chloromethyltetramethyldisiloxane, 10.2 g. of succinic acid, 16.8 g. of the dipotassium salt of succinic acid, and 20 g. of dimethylformamide were mixed and refluxed 1 hour. The resulting product was filtered free of potassium chloride and there was obtained 12.8 g. of this material which corresponds to the theoretical yield. The filtrate was then washed with water to remove dimethylformamide and part of the succinic acid and the remaining material was dissolved in benzene and filtered to remove the remaining succinic acid. The solvent was then removed and there was obtained 25 g. of a water white liquid having a refractive index at 25° C. of 1.4591 and density at 25° C. of 1.11. This product was primarily of the formula

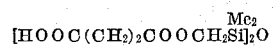

There was also obtained a higher polymeric material similar to that obtained in Example 1.

Example 4

20 g. of bis-chloromethyltetramethyldisiloxane, 17.6 g. of sebacic acid, 24.1 g. of the dipotassium salt of sebacic acid and 20 g. of dimethylformamide were reacted as in Example 2. The product was purified as shown in Example 2 and there was obtained 30.5 g. of a brown waxy solid which in the super cooled state had a refractive index at 25° C. of 1.4625. This material was primarily of the formula

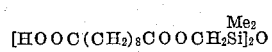

together with some higher polymeric material of a structure similar to that of Example 1.

Example 5

56.5 g. of bis-chloromethyltetramethyldisiloxane, 102 g. of the monopotassium salt of terephthalic acid and 150 g. of dimethylformamide were refluxed for 5 hours. Potassium chloride was then removed by filtration and the remaining product was distilled to remove the unreacted bis-chloromethyltetramethyldisiloxane and the solvent. The remaining solids were extracted with water to remove the unreacted salt of terephthalic acid. The residue amounted to 60 g. and had the formula

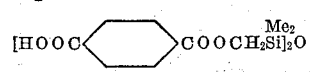

Example 6

A mixture of 20 g. of chloromethylheptamethylcyclotetrasiloxane, 26.5 g. of adipic acid, 5.8 g. of the disodium salt of adipic acid and 30 g. of dimethylformamide were refluxed. The resulting product was filtered to remove sodium chloride and some gel which formed and the liquid product had a refractive index of 25° C. of 1.4464 and a density at 25° C. of 1.1 and had the following formula:

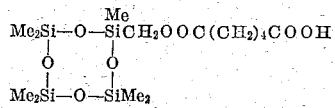

When 1 mol of this cyclic siloxane, 1 mol of phenylmethylsiloxane and 1 mol of monovinylsiloxane are refluxed in toluene solution with 1 g. of trifluoroacetic acid, a copolymer composed of 25 mol percent dimethylsiloxane, 33.3 mol percent phenylmethylsiloxane, 33.3 mol percent monovinylsiloxane and 8.4 mol percent

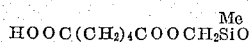

is obtained.

Example 7

When 2 mols of the monosodium salt of maleic acid is reacted with 1 mol of

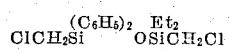

the acid

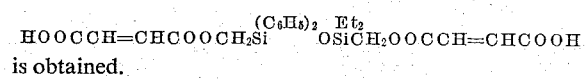

is obtained.

When 1 mol of this disiloxane is heated with 1 mol of chlorophenylmethylsiloxane at 60° C. in the presence of 1 g. of H₂SO₄ a copolymer fluid of the average formula

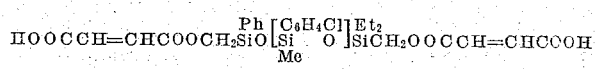

is obtained.

Example 8

When 2 mols of monosodium malate, 1 mol of bis-chloromethyltetramethyldisiloxane and 200 ml. of dimethylformamide are refluxed for 2 hours a mixture of the siloxanes

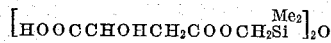

and

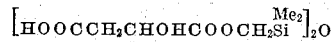

is obtained.

When this mixture is copolymerized with vinylmethylsiloxane in accordance with the method of Example 2, a fluid siloxane copolymer of the average formula

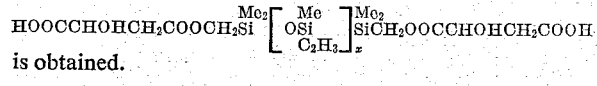

is obtained.

That which is claimed is:

1. A siloxane having the unit formula

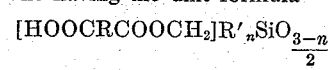

in which R is selected from the group consisting of divalent hydrocarbon radicals and hydroxylated divalent hydrocarbon radicals, R′ is a monovalent hydrocarbon radical and $n$ has an average value from 1 to 2 inclusive.

2. A copolymeric siloxane in which from .01 to 99.99 mol percent of the polymer units are of the formula

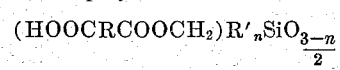

where R is selected from the group consisting of divalent hydrocarbon radicals and hydroxylated divalent hydrocarbon radicals, R′ is a monovalent hydrocarbon radical and $n$ has a value from 1 to 2 inclusive, the remainder of the polymer units in said copolymer being of the formula

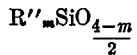

in which R″ is selected from the group consisting of monovalent hydrocarbon radicals and halogenated monovalent hydrocarbon radicals and $m$ has an average value from 1 to 3 inclusive.

3. A siloxane in accordance with claim 1 in which R′ is a methyl radical.

4. A siloxane in accordance with claim 1 in which R′ is a phenyl radical.

5. 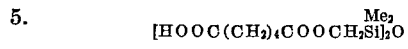
6. 
7. 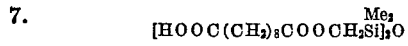
8. 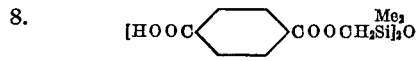

9. A copolymeric siloxane in accordance with claim 3 in which both R′ and R″ are methyl radicals.

10.
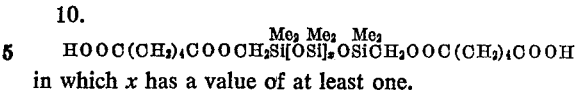
in which $x$ has a value of at least one.

11.
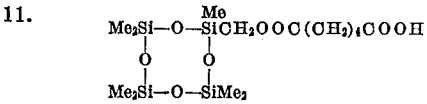

12. A polymeric siloxane of the formula

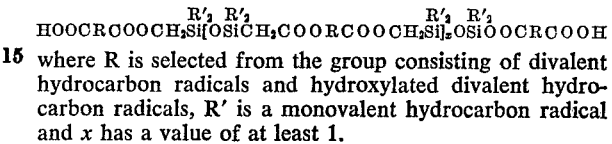

where R is selected from the group consisting of divalent hydrocarbon radicals and hydroxylated divalent hydrocarbon radicals, R′ is a monovalent hydrocarbon radical and $x$ has a value of at least 1.

References Cited in the file of this patent

FOREIGN PATENTS 635,733     Great Britain _____ Apr. 12, 1950